United States Patent
Shen et al.

(10) Patent No.: US 12,047,436 B2
(45) Date of Patent: Jul. 23, 2024

(54) SETTING APPARATUS, COMMUNICATION SYSTEM, SETTING METHOD, AND PROGRAM

(71) Applicant: NTT Communications Corporation, Tokyo (JP)

(72) Inventors: Wenyu Shen, Tokyo (JP); Takeo Saga, Tokyo (JP); Kenji Arai, Tokyo (JP); Ryu Kanishima, Tokyo (JP)

(73) Assignee: NTT COMMUNICATIONS CORPORATION, Tokyo (JP)

(*) Notice: Subject to any disclaimer, the term of this patent is extended or adjusted under 35 U.S.C. 154(b) by 0 days.

(21) Appl. No.: 17/650,113

(22) Filed: Feb. 7, 2022

(65) Prior Publication Data
US 2022/0159062 A1     May 19, 2022

Related U.S. Application Data

(63) Continuation of application No. PCT/JP2019/038797, filed on Oct. 1, 2019.

(51) Int. Cl.
*H04L 67/10* (2022.01)
*G16Y 40/30* (2020.01)

(52) U.S. Cl.
CPC .............. *H04L 67/10* (2013.01); *G16Y 40/30* (2020.01)

(58) Field of Classification Search
CPC ..... G16Y 40/30; H04L 41/0803; H04L 67/10; H04L 41/0895; H04L 67/025; H04L 67/12
See application file for complete search history.

(56) References Cited

U.S. PATENT DOCUMENTS

| | | |
|---|---|---|
| 2014/0122674 A1 | 5/2014 | Gray et al. |
| 2017/0078216 A1 | 3/2017 | Adolph et al. |
| 2017/0169462 A1 | 6/2017 | Meredith et al. |
| 2017/0357528 A1 | 12/2017 | Puranik et al. |
| 2018/0034698 A1 | 2/2018 | Perez et al. |
| 2018/0295485 A1 | 10/2018 | Jalkanen et al. |
| 2019/0190782 A1 | 6/2019 | Panje |
| 2020/0089481 A1* | 3/2020 | Asanghanwa ........ G06F 9/5072 |

(Continued)

FOREIGN PATENT DOCUMENTS

| | | |
|---|---|---|
| EP | 3386219 | 10/2018 |
| JP | 2019-022205 | 2/2019 |

OTHER PUBLICATIONS

A. Ahmed and G. Pierre, "Docker Container Deployment in Fog Computing Infrastructures," 2018 IEEE International Conference on Edge Computing (Edge), San Francisco, CA, USA, 2018, pp. 1-8, doi: 10.1109/EDGE.2018.00008. (Year: 2018).*

(Continued)

*Primary Examiner* — Jason D Recek
(74) *Attorney, Agent, or Firm* — IPUSA, PLLC

(57) ABSTRACT

A setting apparatus for setting a communication apparatus, the setting apparatus includes a memory and a processor configured to acquire auxiliary information from a management apparatus configured to execute processing for accessing a cloud, and transmit setting information including the auxiliary information to the communication apparatus. The auxiliary information is set to an IoT edge execution environment established in the communication apparatus.

8 Claims, 24 Drawing Sheets

(56) References Cited

U.S. PATENT DOCUMENTS

2021/0160331 A1* 5/2021 Wang .................... H04L 67/566

OTHER PUBLICATIONS

International Search Report for PCT/JP2019/038797 mailed on Nov. 5, 2019.

Barozet, Jean-Marc, "Cisco SDWAN Deep Dive, The Southern California Cisco User Group Presentation (Online)", The Southern California Cisco User Group, Feb. 2019, [retrieval date Oct. 21, 2019], Internet: <http://www.sccug.net/presentations/>.

Matsuoka, Naoki et al. "Development of a home gateway management system based on TR-069", IEICE technical report, vol. 107, No. 223, Sep. 14, 2007, pp. 3-8 (with English abstract).

Wang, An et al., "Software-Defined Networking Enhanced Edge Computing: A Network-Centric Survey", Proceedings of the IEEE, Aug. 6, 2019, vol. 107, issue: 8, Aug. 2019, pp. 1500-1519.

Liu, Jiangi et al., "A Scalable and Quick-Response Software Defined Vehicular Network Assisted by Mobile Edge Computing", IEEE Communications Magazine, Jul. 14, 2017, vol. 55, issue: 7, Jul. 2017, pp. 94-100.

Extended European Search Report issued in the counterpart European Patent Application No. 19947749.8, mailed May 8, 2023.

Ramalho Flavio De Sousa: "SmartEdge: Fog Computing Cloud Extensions to Support Latency-Sensitive IoT Applications", Master's Defense Examination submitted to the Graduate Program in Systems and Computing, Department of Computer Science and Applied Mathematics at Federal University of Rio Grande do Norte as a requirement for a Master's Degree in Computer Systems, Dec. 1, 2016 (Dec. 1, 2016), pp. 1-109, XP055506806, US.

Office Action issued in the counterpart Japanese Patent Application No. 2021-550821, mailed Aug. 29, 2023.

Office Action issued in the counterpart Chinese Patent Application No. 201980099595.1, mailed Aug. 25, 2023.

* cited by examiner

FIG.4

| BASIC INFORMATION | DEVICE NAME | Branch1 |
| --- | --- | --- |
| | SERIAL NUMBER | XXX |
| SERVICE TEMPLATE | AAA | |
| OTHER CONFIGURATION INFORMATION | NW CONFIGURATION INSIDE DEVICE (INTERFACE INFORMATION, NW TOPOLOGY, etc.) | |

FIG.5

VNF DESCRIPTOR

| BASIC INFORMATION | IDENTIFIER | XXX |
| --- | --- | --- |
| | MEMORY | 8G |
| | vCPU | 4 |
| | DISK SIZE | 40G |
| PORT INFORMATION | Port1 | |
| | Port2 | |

FIG.6

SERVICE DESCRIPTOR

| BASIC INFORMATION | | IDENTIFIER | | SERVICE NAME | AAA |
|---|---|---|---|---|---|
| | | CONFIGURATION VNF | | VM NAME | XXX |
| SUBNET | CONNECTION 1 | | CIDR | | X1.X1.X1.X1/X1 |
| | | | GW | | Y1.Y1.Y1.Y1 |
| | | | VLAN | | X1 |
| | CONNECTION 2 | | CIDR | | X2.X2.X2.X2/X2 |
| | | | GW | | Y2.Y2.Y2.Y2 |
| | | | VLAN | | X2 |
| LINK | LINK 1 | | CONNECTION SOURCE | | XXX –> port1 |
| | | | CONNECTION DESTINATION | | CONNECTION 1 |
| | LINK 2 | | CONNECTION SOURCE | | XXX –> port2 |
| | | | CONNECTION DESTINATION | | CONNECTION 2 |

FIG.9

VNF DESCRIPTOR

| BASIC INFORMATION | IDENTIFIER | XXX |
| --- | --- | --- |
| | MEMORY | 8G |
| | vCPU | 4 |
| | DISK SIZE | 40G |
| PORT INFORMATION | Port1 | |
| | Port2 | |
| USER DATA | #cloud-config<br>repo-update: true<br>repo-upgrade: all | |

FIG.12

VNF DESCRIPTOR

| BASIC INFORMATION | IDENTIFIER | XXX |
| | MEMORY | 8G |
| | vCPU | 4 |
| | DISK SIZE | 40G |
| PORT INFORMATION | Port1 | |
| | Port2 | |
| MANAGEMENT INTERFACE | IP ADDRESS | X.X.X.X |
| SSH script | #shell script apt-get update apt-get upgrade | |

FIG.15

| GROUP NAME | Group1 | | |
|---|---|---|---|
| AUTHENTICATION INFORMATION | KEY INFORMATION | AAA.key |
| | CERTIFICATE | BBB.pem |

FIG.16

VNF DESCRIPTOR (FOR Cloud Init)

| BASIC INFORMATION | IDENTIFIER | XXX |
| | MEMORY | 8G |
| | vCPU | 4 |
| | DISK SIZE | 40G |
| PORT INFORMATION | Port1 | |
| | Port2 | |
| USER DATA | Key | xxxxxxx |
| | Cert | yyyyyyy |
| | #cloud-config<br>write_files:<br>- content: \|<br>    $Key<br>  path: AAA/AAA.key<br>write_files:<br>- content: \|<br>    $Cert<br>  path: BBB/BBB.pem | |
| LINKAGE INFORMATION FOR IoT EDGE MANAGEMENT UNIT | GROUP NAME | Group1 |

FIG.20

| BASIC INFORMATION | DEVICE NAME | Branch1 |
| --- | --- | --- |
| | SERIAL NUMBER | $serial |
| SERVICE TEMPLATE | AAA | |
| OTHER CONFIGURATION INFORMATION | NW CONFIGURATION INSIDE DEVICE (INTERFACE INFORMATION, NW TOPOLOGY, etc.) | |

FIG.21

VNF DESCRIPTOR (FOR Cloud Init)

| LINKAGE FOR IoT EDGE MANAGEMENT UNIT | GROUP NAME | $group |
|---|---|---|

FIG.22

SERVICE DESCRIPTOR

| | IDENTIFIER | | SERVICE NAME | AAA |
|---|---|---|---|---|
| BASIC INFORMATION | CONFIGURATION VNF | | VM NAME | XXX |
| SUBNET | CONNECTION 1 | | CIDR | $cidr |
| | | | GW | $gw |
| | | | VLAN | X1 |
| | CONNECTION 2 | | CIDR | X2.X2.X2.X2/X2 |
| | | | GW | Y2.Y2.Y2.Y2 |
| | | | VLAN | X2 |
| LINK | LINK 1 | | CONNECTION SOURCE | XXX -> port1 |
| | | | CONNECTION DESTINATION | CONNECTION 1 |
| | LINK 2 | | CONNECTION SOURCE | XXX -> port2 |
| | | | CONNECTION DESTINATION | CONNECTION 2 |

FIG.23

|         | CPE1           | CPE2           | CPE3           |
|---------|----------------|----------------|----------------|
| $serial | XXX            | YYY            | ZZZ            |
| $group  | Group1         | Group2         | Group3         |
| $cidr   | X1.X1.X1.X1/X1 | X2.X2.X2.X2/X2 | X3.X3.X3.X3/X3 |
| $gw     | Y1.Y1.Y1.Y1    | Y2.Y2.Y2.Y2    | Y3.Y3.Y3.Y3    |

SETTING APPARATUS, COMMUNICATION SYSTEM, SETTING METHOD, AND PROGRAM

CROSS-REFERENCE TO RELATED APPLICATIONS

This application is a continuation of International Application No. PCT/JP2019/038797, filed on Oct. 1, 2019 and designating the U.S. The contents of this applications are incorporated herein by reference in their entirety.

BACKGROUND OF THE INVENTION

1. Field of the Invention

The present disclosure relates to a setting apparatus for setting a communication apparatus and the like.

2. Description of the Related Art

Since a network supporting an Internet of Things (IoT) system has been designed based on the two-tier model of Things and Cloud, all data collected from the Things is transmitted to the Cloud, and various processes such as analysis, shaping, and visualization are performed on the Cloud.

In recent years, design concepts of networks for IoT systems have changed significantly along with the prevalence of edge computing concepts. Therefore, in addition to the two-tier model described above, a new tier called the IoT edge has been added. As a result of this change, a design of distributing some of the intelligence on the cloud to an edge near the user's location, processing the data collected from the Things to some extent on the edge side, and then transmitting the data to the cloud has become the de facto standard.

Following this change, major cloud providers have begun to offer services related to the IoT edge while promoting advantages such as low delay, autonomy, closedness, and cost reduction as appeal points. By using such a service, an IoT edge execution environment can be provided to the user's location side, and at the same time, the IoT edge execution environment and the cloud can be linked to realize distribution of IoT applications remotely.

However, in the conventional IoT edge services, in order to correctly establish and operate the IoT edge execution environment when introducing the service, a technician with advanced skills was dispatched to the user's location, and the technician had to perform a complicated setting operation in the field with respect to the communication apparatus.

The present invention has been made in view of the above, an object of the present invention is to provide a technique that enables the IoT edge execution environment to be operated in a communication apparatus without performing a complicated manual setting operation.

RELATED-ART DOCUMENTS

Patent Documents

Patent Document 1: Japanese Patent Application Publication No. 2019-022205

SUMMARY OF THE INVENTION

According to the disclosed technique, a setting apparatus for setting a communication apparatus, the setting apparatus includes a memory and a processor configured to acquire auxiliary information from a management apparatus configured to execute processing for accessing a cloud, and transmit setting information including the auxiliary information to the communication apparatus. The auxiliary information is set to an IoT edge execution environment established in the communication apparatus.

According to the disclosed technique, a technique that enables the IoT edge execution environment to be operated in a communication apparatus without performing a complicated manual setting operation is provided.

BRIEF DESCRIPTION OF THE DRAWINGS

FIG. 4 is a diagram illustrating an example of a CPE apparatus template;

FIG. 5 is a diagram illustrating an example of a VNF descriptor;

FIG. 6 is a diagram illustrating an example of a service descriptor;

FIG. 9 is a diagram illustrating an example of a VNF descriptor;

FIG. 12 is a diagram illustrating an example of a VNF descriptor;

FIG. 15 is a diagram illustrating configuration information for IoT edge execution environment management;

FIG. 16 is a diagram illustrating an example of a VNF descriptor;

FIG. 20 is a diagram illustrating an example of a CPE apparatus template;

FIG. 21 is a diagram illustrating an example of a VNF descriptor;

FIG. 22 is a diagram illustrating an example of a service descriptor;

FIG. 23 is a diagram illustrating an example of data related to a CPE apparatus;

DESCRIPTION OF THE EMBODIMENTS

Hereinafter, embodiments of the present disclosure (the present embodiment) will be described with reference to the drawings. The embodiments described below are merely examples, and the embodiments to which the present invention is applied are not limited to the following embodiments.

First Embodiment

<Entire Configuration of System>

Figure 1:
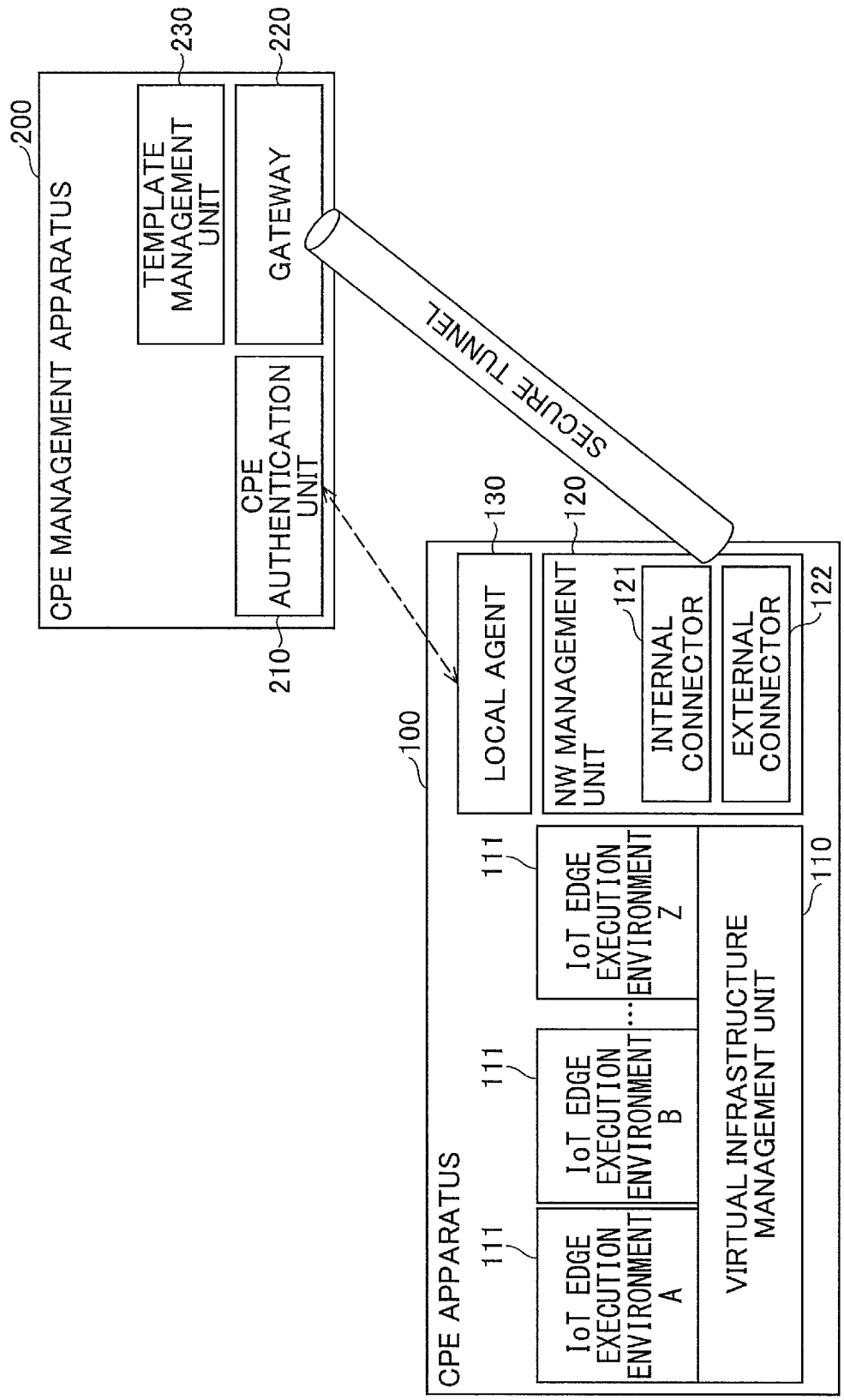
FIG. 1 is a schematic diagram of a configuration of a system according to a first embodiment.

FIG. 1 illustrates a system configuration according to a first embodiment. As illustrated in FIG. 1, the system according to the first embodiment includes a Customer-Premises Equipment (CPE) apparatus 100 (which may be referred to as a CPE base 100) and a CPE management apparatus 200. The CPE apparatus 100 and the CPE management apparatus 200 each connect to a network and communicate with the CPE apparatus 100 and the CPE management apparatus 200 via a secure tunnel which will be described below.

The CPE apparatus 100 is a platform provided at a user's location. If the user has multiple locations, the CPE apparatus 100 is provided at each location. Accordingly, in many cases, multiple CPE apparatus 100 exist and are distributed to each location. The CPE apparatus 100 may also be referred to as an IoT edge device. One or more IoT devices, such as sensors, are wired or wirelessly connected to the CPE apparatus 100.

The CPE management apparatus 200 is centralized and basically multiple CPE apparatus 100 can be managed using a single CPE management apparatus 200. However, a configuration including multiple CPE management apparatus 200 may be employed, such as by redundant design.

The CPE management apparatus 200 may be referred to as a setting apparatus, and the CPE apparatus 100 may be called a communication apparatus. A system including the CPE management apparatus 200 and the CPE apparatus 100 may be referred to as a communication system.

<Configuration of CPE Apparatus 100>

As illustrated in FIG. 1, the CPE apparatus 100 includes a virtual infrastructure management unit 110, an NW management unit 120, and a local agent 130. One or a plurality of IoT edge execution environments 111 are executed on the virtual infrastructure management unit 110, and the virtual infrastructure management unit 110 performs life cycle management of the one or the plurality of IoT edge execution environments 111.

Figure 2:
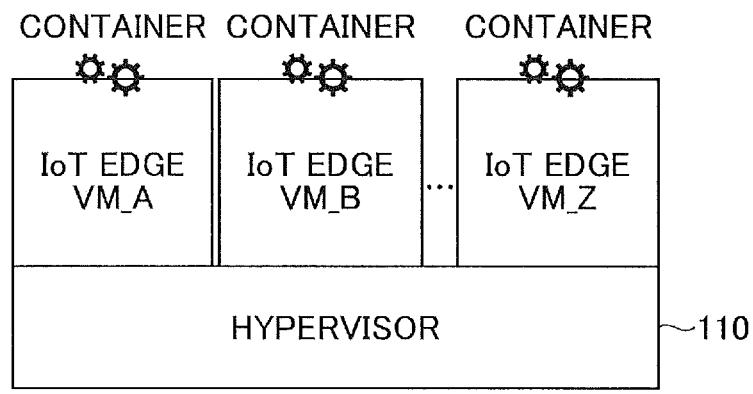
FIG. 2 is a diagram illustrating a VM type virtual infrastructure management unit 110.
Figure 3:
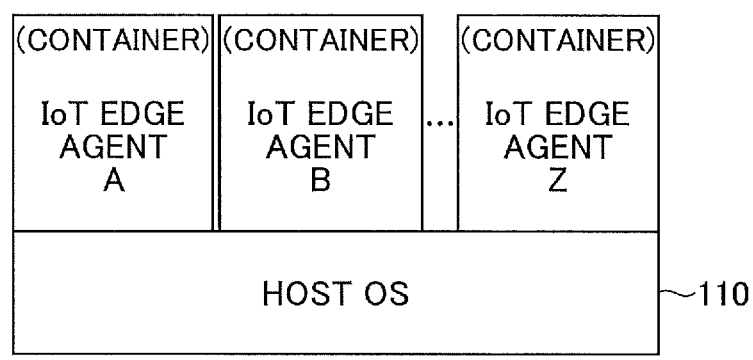
FIG. 3 a diagram illustrating a container-based virtual infrastructure management unit 110.

The IoT edge execution environment 111 provides an environment in which an IoT application actually operates. FIG. 2 and FIG. 3 illustrate two types of specific examples of the virtual infrastructure management unit 110 and the IoT edge execution environment 111. However, the virtual infrastructure management unit 110 and the IoT edge execution environment 111 are not limited to these two types.

FIG. 2 illustrates Type 1 (Virtual Machine (VM) system). In the VM system, the virtual infrastructure management unit 110 is implemented in a Hypervisor such as a Kernel-based Virtual Machine (KVM), and the IoT edge execution environment 111 is implemented as a VM.

FIG. 3 illustrates Type 2 (container-based system). In the container-based system, the virtual infrastructure management unit 110 is implemented in an operating system (OS) such as Linux (registered trademark) in which Docker (registered trademark) is installed, and the IoT edge execution environment 111 is implemented in a container or the like.

In both FIG. 2 and FIG. 3, the IoT application is assumed to be implemented in a container.

The NW management unit 120 of the CPE apparatus 100 illustrated in FIG. 1 manages internal and external connections of the CPE apparatus 100. An internal connector 121 controls the connection between the IoT edge execution environment and a physical interface, or between the IoT edge execution environment and a logical interface. An external connector 122 controls the connection between the CPE apparatus 100 and the external system.

As illustrated in FIG. 1, an external connector 122 can be used to create a secure tunnel, such as an IPsec, between the CPE apparatus 100 and the CPE management apparatus 200. After the secure tunnel is created, communication between the CPE apparatus 100 and the CPE management apparatus 200 is basically performed via the secure tunnel. The same applies to the second to fifth embodiments in that communication between the CPE apparatus 100 and the CPE management apparatus 200 is performed via a secure tunnel.

The local agent 130 of the CPE apparatus 100 serves as an application interface between the CPE apparatus 100 and an external system, and performs authentication of the CPE apparatus 100 and control of instructions from the CPE management apparatus 200 in cooperation with the CPE management apparatus 200 as illustrated in FIG. 1.

<Configuration of CPE Management Apparatus 200>

As illustrated in FIG. 1, the CPE management apparatus 200 includes a CPE authentication unit 210, a gateway 220, and a template management unit 230.

The CPE authentication unit 210 receives an authentication request sent from the CPE apparatus 100 and determines whether the CPE apparatus 100 may be connected to the CPE management apparatus 200.

The gateway 220 serves as an entrance from the outside of the CPE management apparatus 200 and for example, in order to communicate with the CPE apparatus 100, a secure tunnel is created with the CPE apparatus 100 via the gateway 220. The gateway 220 may also be referred to as a tunnel creation unit.

The template management unit 230 performs management such as generating, storing, reading, updating, and deleting of a CPE apparatus template that describes a parameter related to the CPE apparatus 100 and a service template that describes a parameter related to a service included in the CPE apparatus 100. The template management unit 230 may be referred to as a setting information management unit. Further, the service template may be referred to as setting information.

FIG. 4 illustrates an example of the CPE apparatus template. As illustrated in FIG. 4, the CPE apparatus template includes a device name of the CPE apparatus 100 to be managed by the CPE management apparatus 200 and a serial number of the device as basic information. For example, the template management unit 230 can identify an individual CPE apparatus 100 by matching a serial number sent from the accessing CPE apparatus 100 with the serial number described in the CPE apparatus template. FIG. 4 illustrates information related to a single CPE apparatus 100, but in practice, there is the same amount of information as the number of CPE apparatus 100 to be managed by the CPE management apparatus 200.

The CPE apparatus template includes a service template name (service name) associated with the corresponding CPE apparatus 100 in the item of the service template. The CPE apparatus template includes information of the NW configuration inside the device (interface information, NW topology, and the like) as other information.

The service template will be described with reference to FIG. 5 and FIG. 6. The service template consists of a service descriptor (FIG. 6) that describes a parameter of the configuration of the service and a VNF descriptor (FIG. 5) that describes a parameter of the individual IoT edge execution environment constituting the service.

In the present embodiment, the IoT edge execution environment 111 is assumed to be implemented in the VM, and the VNF descriptor (FIG. 5) describes resource information (for example, vCPU, memory, disk size, and port) necessary for executing the IoT edge execution environment 111. Further, an identifier is used to identify the individual IoT edge execution environment 111.

As illustrated in FIG. 6, the service descriptor of the present embodiment indicates a configuration VNF, a subnet, and a link between the configuration VNF and the subnet. The subnet, the link, and the like indicate the configuration of the network connection in the CPE apparatus 100. FIG. 6 illustrates that the target VM (XXX) includes Port 1 and Port 2, Port 1 is connected to Connection 1 (a "connection" may be considered as a logical cable), and Port 2 is connected to Connection 2.

As illustrated in FIG. 6, a parameter of the subnet includes, but is not limited to, Class Inter-Domain Routing (CIDR), Gateway (GW), and VLAN. Further, an identifier is used to associate with the VNF descriptor of the configuration VNF.

In the present embodiment using the CPE apparatus template and the service template illustrated in FIG. 4, FIG. 5, and FIG. 6, a CPE apparatus 100 called Branch 1 is provided, and a service AAA is included therein. The service AAA includes VNF XXX. Each of Port 1 and Port 2 of XXX indicates the service configuration that connects to Connection 1 and Connection 2 of the subnet.

The above configuration is merely an example. For example, a plurality of VNF (VM) may be provided in the CPE apparatus 100 and a connection configuration between the VNFs may be described in the service template.

(Setting Procedure for CPE Apparatus 100)

Figure 7:
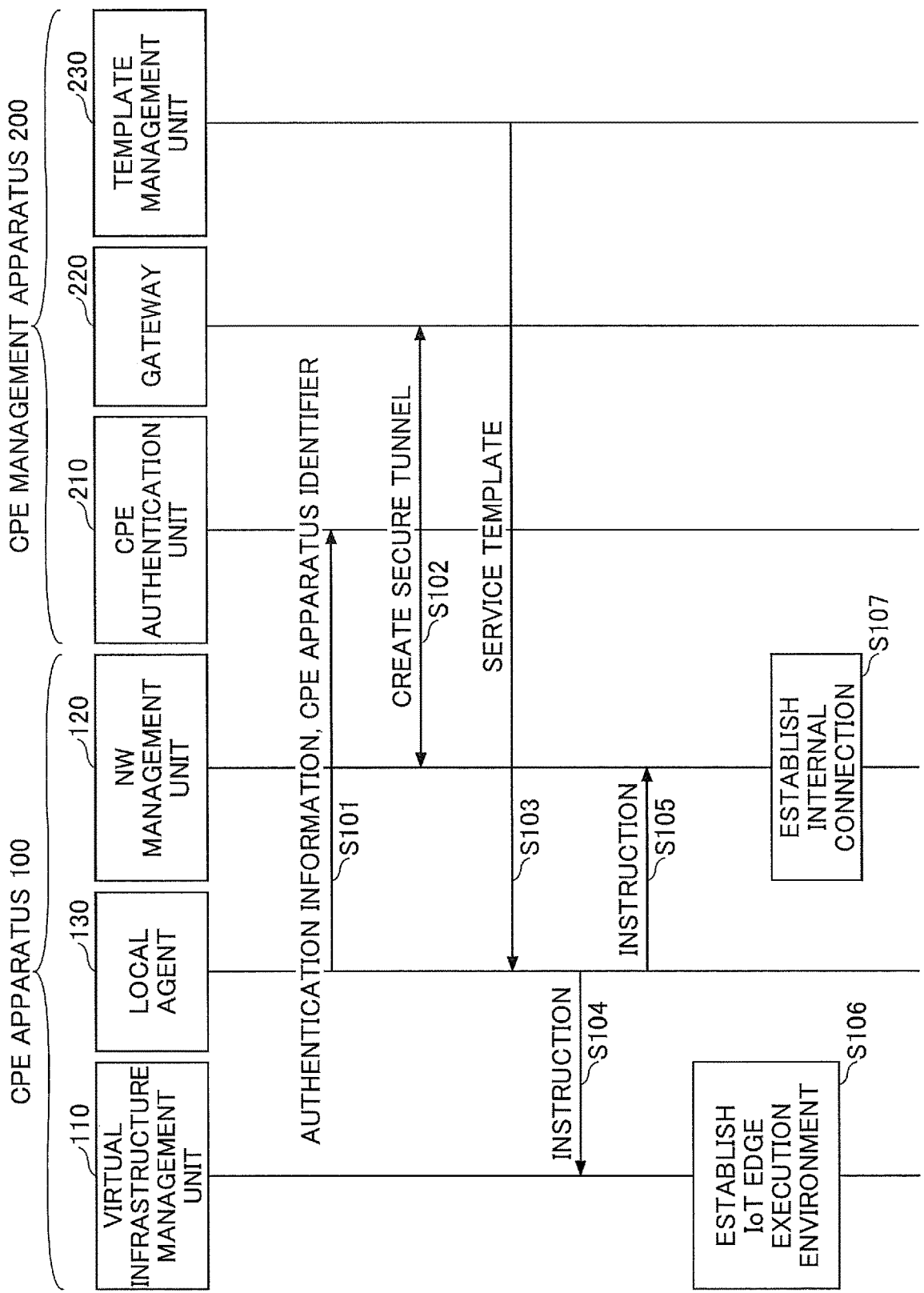
FIG. 7 is a sequence diagram for explaining a provisioning method of an IoT edge.

Next, an example of an operation procedure in provisioning an IoT edge (CPE apparatus 100) will be described with reference to a sequence diagram illustrated in FIG. 7. In the following procedure, it is assumed that the CPE apparatus template illustrated in FIG. 4 and the service template illustrated in FIG. 5 and FIG. 6 are prepared in advance and stored in the template management unit 230.

After the CPE apparatus 100 is connected to the external network, in S101, the local agent 130 transmits authentication information and an identifier (for example, a serial number) for identifying the CPE apparatus 100 to the CPE authentication unit 210 to perform authentication on the connection availability.

For example, SSLVPN, IPsec, or the like can be used as an authentication method. However, it is not necessary to be limited to them, and other authentication methods may be used. Further, a certificate, a password, a Pre-shared key, and the like can also be used as the authentication information, but there is no limitation to this configuration. Here, the authentication is considered successful.

In S102, the NW management unit 120 creates a secure tunnel with the gateway 220 of the CPE management apparatus 200 through the external connector 122. For example, IPsec with a pre-shared key can be used as a means for implementing a secure tunnel, but there is no limitation to this configuration.

After the tunnel is created between the CPE apparatus 100 and the CPE management apparatus 200 as described above, in S103, the template management unit 230 of the CPE management apparatus 200 specifies the CPE apparatus 100 using the identifier (for example, the serial number) received from the CPE apparatus 100 and the CPE apparatus template, and transmits the service template of the specified CPE apparatus 100 to the local agent 130 via the secure tunnel. Note that the service template and the CPE apparatus template may be transmitted in S103.

In the CPE apparatus 100, the local agent 130 sends an instruction to the virtual infrastructure management unit 110 and to the NW management unit 120 in accordance with the received service template (S104 and S105). As a result, the IoT edge execution environment 111 is established by the virtual infrastructure management unit 110 (S106), and related CPE internal connection is established by the NW management unit 120 (S107). Specifically, the IoT edge execution environment 111 is established in accordance with the VNF descriptor, and the CPE internal connection is established in accordance with the service descriptor.

When the IoT edge execution environment 111 is started, the initial setting for the IoT edge execution environment 111 is performed. In the first embodiment, the initial setting may be performed according to the method of the second embodiment or the method of the third embodiment, which will be described later. Alternatively, the initial setting may be performed by other methods.

Second Embodiment

Next, a second embodiment will be described. In the second embodiment, an automatic input method of initial setting, after the IoT edge execution environment is established and started, by using an initial setting management unit 115 will be described. The configuration and the procedure other than the configuration and the procedure related to the automatic input of the initial setting by using the initial setting management unit 115 are the same as that in the first embodiment.

<System Configuration>

Figure 8:
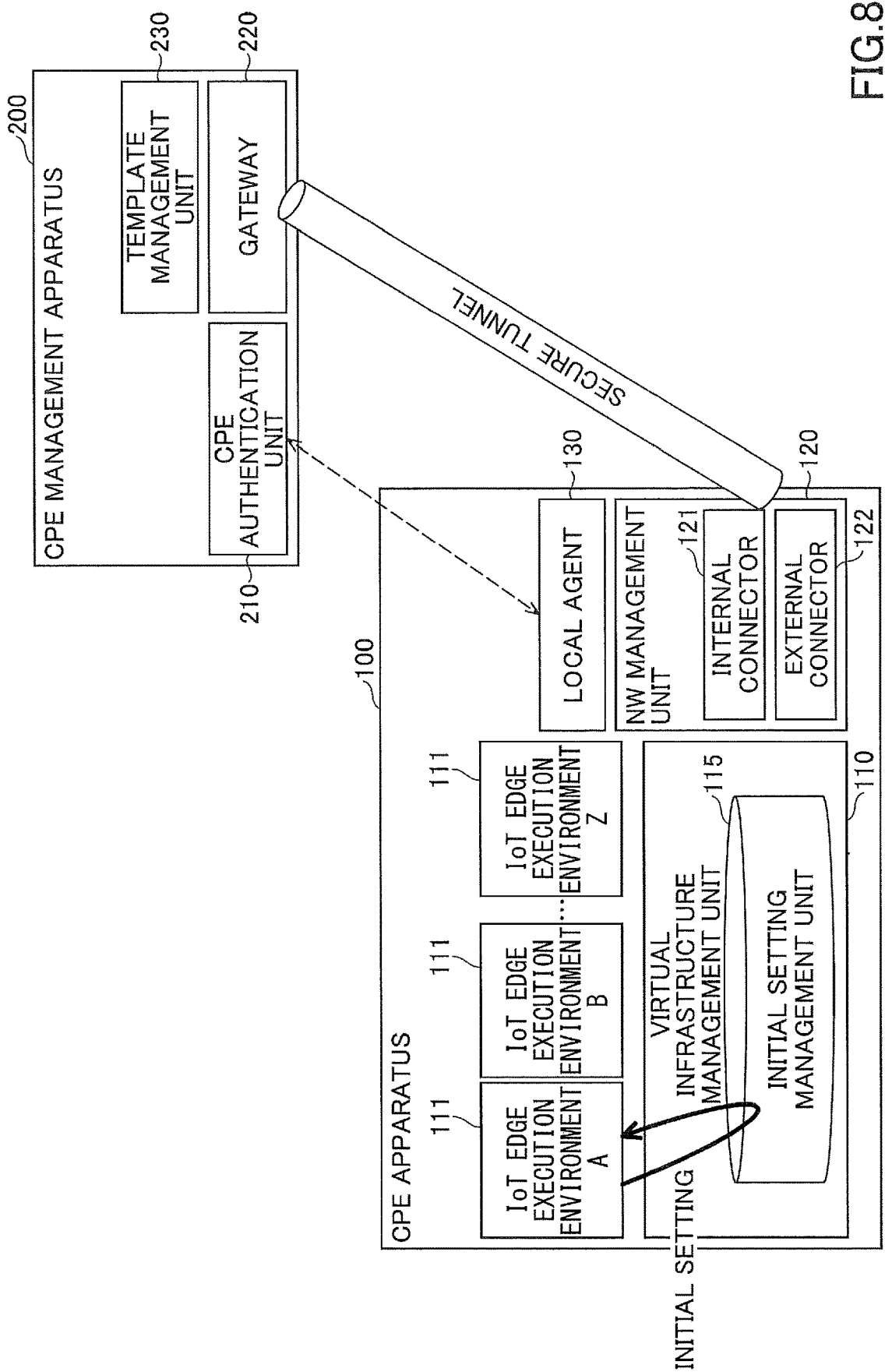
FIG. 8 is a schematic diagram of a configuration of a system according to a second embodiment.

FIG. 8 illustrates a system configuration according to the second embodiment. As illustrated in FIG. 8, in the system according to the second embodiment, a virtual infrastructure management unit 110 of a CPE apparatus 100 includes the initial setting management unit 115. The system configuration other than the initial setting management unit 115 is the same as the system configuration according to the first embodiment (i.e., FIG. 1). Hereinafter, differences from the first embodiment will be mainly described.

FIG. 9 illustrates a VNF descriptor according to the second embodiment. As illustrated in FIG. 9, information of user data is added to the VNF descriptor according to the first embodiment (i.e., FIG. 5). In the second embodiment, a scenario is illustrated in which the setting of the IoT edge execution environment 111 is automatically updated after the IoT edge execution environment 111 (identifier: XXX) is started, but there is no limitation to this configuration. In the example of FIG. 9, cloud-configuration is used as the user data, which is merely an example.

<Initial Setting Procedure>

Figure 10:
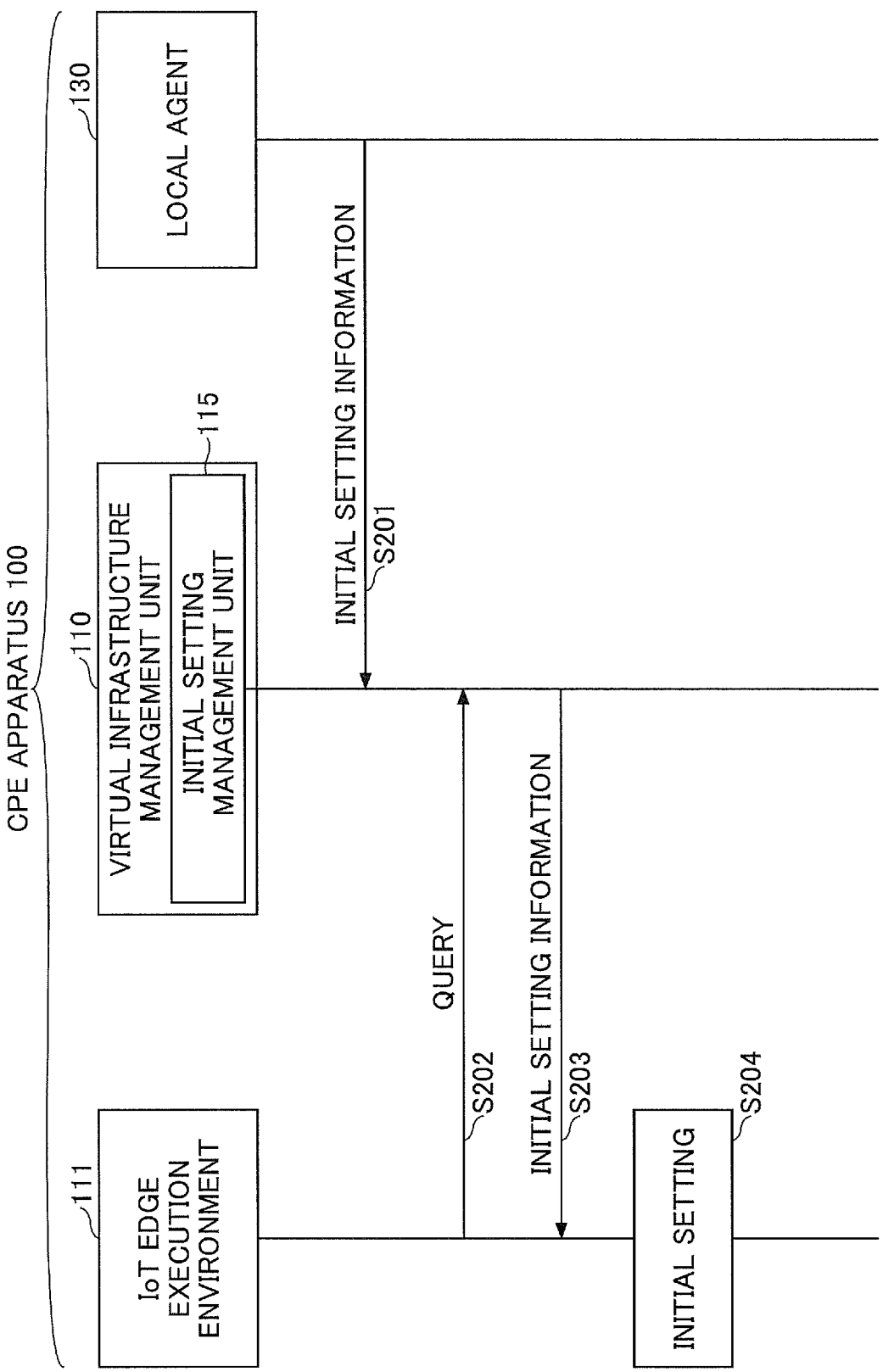
FIG. 10 is a sequence diagram for explaining a provisioning method of an IoT edge.

The initial setting procedure according to the second embodiment will be described with reference to the sequence diagram of FIG. 10. At a step prior to S201, S103 of FIG. 7 in the first embodiment has been executed, and the local agent 130 has received the service template.

In S201, the local agent 130 stores the initial setting information (for example, user data in the VNF descriptor) included in the service template in the initial setting management unit 115.

After the IoT edge execution environment 111 is established and started, the IoT edge execution environment 111 queries the initial setting management unit 115 (S202) and acquires initial setting information (for example, the user data in the VNF descriptor) of the target (S203). The IoT edge execution environment 111 accesses the initial setting management unit 115 by using a predetermined IP address. However, the access may be implemented in a way other than using the predetermined IP addresses.

In S204, the IoT edge execution environment 111 performs initial setting using the acquired initial setting information. For example, the IoT edge execution environment 111 performs the initialization by executing the commands described in the cloud-configuration.

In the second embodiment, as an example, the initial setting of the IoT edge execution environment 111 is described. However, the method described in the second embodiment may be used for a setting not limited to the initial setting.

Third Embodiment

Next, a third embodiment will be described. The third embodiment describes an automatic input method of initial setting, after the IoT edge execution environment is established and started, by using the remote setting unit 240. The configuration and the procedure other than the configuration and the procedure related to the automatic input of the initial setting by using the remote setting unit 240 are the same as that in the first embodiment. Further, instead of the initial setting using the initial setting management unit 115 according to the second embodiment, the initial setting may be performed using the remote setting unit 240 according to the third embodiment. Further, the initial setting may be performed using the remote setting unit 240 according to the third embodiment in addition to the initial setting using the initial setting management unit 115 according to the second embodiment.

<System Configuration>

Figure 11:
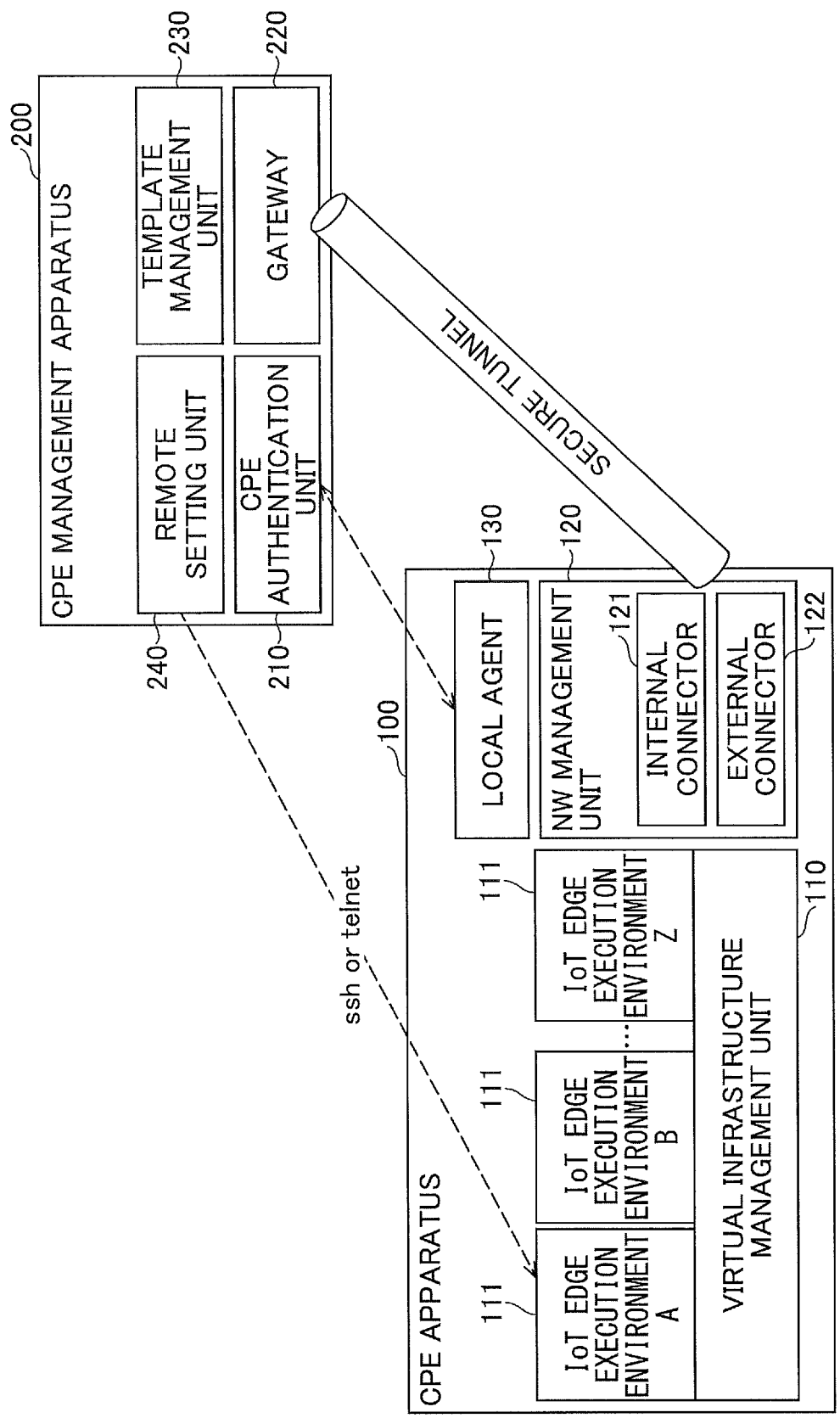
FIG. 11 is a schematic diagram of a configuration of a system according to a third embodiment.

FIG. 11 illustrates a system configuration according to the third embodiment. As illustrated in FIG. 11, in the system according to the third embodiment, a CPE management apparatus 200 includes the remote setting unit 240. The system configuration other than the remote setting unit 240 is the same as the system configuration according to the first embodiment (e.g., FIG. 1). Hereinafter, differences from the first embodiment will be mainly described.

The remote setting unit 240 is configured to access an individual IoT edge execution environment 111 to input setting remotely.

FIG. 12 illustrates a VNF descriptor according to the third embodiment. As illustrated in FIG. 12, management interface information (specifically, an IP address of the IoT edge execution environment to be accessed) and an SSH script are added to the VNF descriptor according to the first embodiment (i.e., FIG. 5). In the third embodiment, a scenario is illustrated in which the IoT edge execution environment 111 is automatically updated after the IoT edge execution environment 111 is started, but there is no limitation to this configuration. Further, in FIG. 12, a shell script is used as the setting information to be input in the SSH connection, but the use of the shell script is merely an example.

<Initial Setting Procedure>

Figure 13:
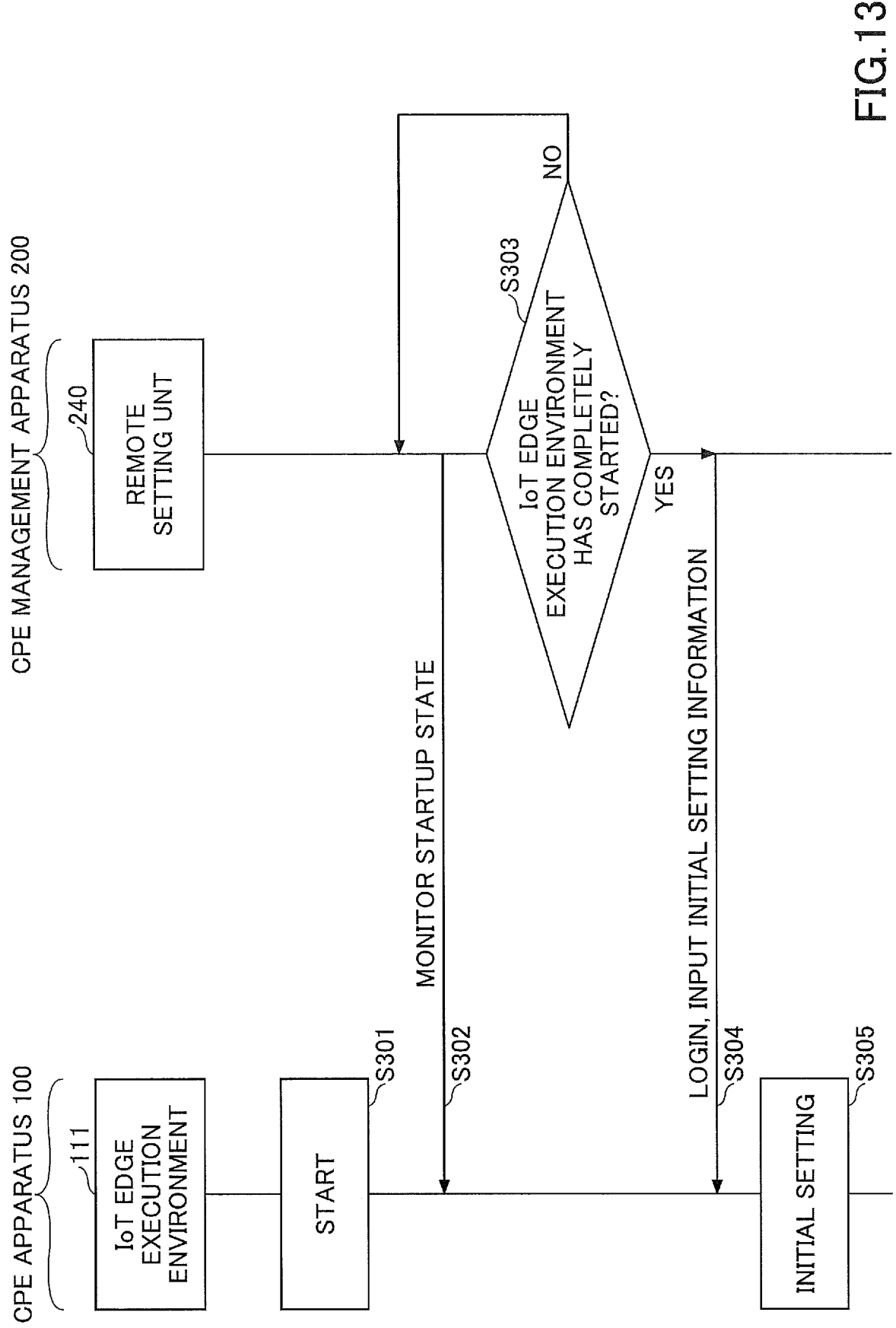
FIG. 13 is a sequence diagram for explaining a provisioning method of an IoT edge.

The initial setting procedure for the IoT edge execution environment 111 according to the third embodiment will be described with reference to the sequence diagram of FIG. 13.

The IoT edge execution environment 111 is established and started by the procedure described in the first embodiment (S301). In S302, the remote setting unit 240 accesses a CPE apparatus 100 to monitor the startup state of the IoT edge execution environment 111.

In S303, the remote setting unit 240 determines whether the IoT edge execution environment 111 is completely started. When it is determined that the IoT edge execution environment 111 has not been completely started (NO in S303), the remote setting unit 240 sets a timer, waits for a predetermined time, and then performs the determination of S303 again.

As a method of determining whether the IoT edge execution environment 111 has been completely started, for example, the following Determination Method 1 and Determination Method 2 are provided. Either of Determination Method 1 or Determination Method 2 may be used.

Determination Method 1 of complete startup: Monitoring a specific process (for example, SSH) in the IoT edge execution environment 111 and determining that the specific process has been started, the IoT edge execution environment 111 is determined to have been completely started.

Determination Method 2 of complete startup: The IoT edge execution environment 111 is determined to have been completely started when a specific time (for example, 90 seconds) has elapsed from the start of the startup state monitoring.

Both Determination Method 1 and Determination Method 2 assume that no error occurs in a predetermined process in the IoT edge execution environment 111.

When it is determined that the IoT edge execution environment 111 has been completely started (YES in S303), the remote setting unit 240 remotely logs in to the IoT edge execution environment 111 and inputs the setting information described in the SSH script of the VNF descriptor into the IoT edge execution environment 111 (S304). The IoT edge execution environment 111 performs the initial setting, for example, by executing the shell script (S305).

The third embodiment assumes that the SSH is used for initial setting of the IoT edge execution environment 111, but this is merely an example and Telnet or the like may be used.

In the third embodiment, as an example, the initial setting of the IoT edge execution environment 111 is described. However, the method described in the third embodiment may be used for a setting not limited to the initial setting.

Fourth Embodiment

Next, a fourth embodiment will be described. In the fourth embodiment, an IoT edge management unit 300 is added, and a CPE management apparatus 200 works together with the IoT edge management unit 300 to perform provisioning of the IoT edge, including creation of configuration information for the IoT edge execution environment management, access authentication to the cloud of the IoT edge execution environment, remote distribution of the IoT application, and the like.

The configuration and the procedure other than the configuration and the procedure involved in the implementation of the provisioning of the IoT edge are the same as that in the first embodiment and second embodiment. Further, in the fourth embodiment, the configuration and the procedure of the third embodiment may be applied instead of the configuration and the procedure of the second embodiment. Hereinafter, differences from the first embodiment and from the second/third embodiment will be mainly described.

<System Configuration>

Figure 14:
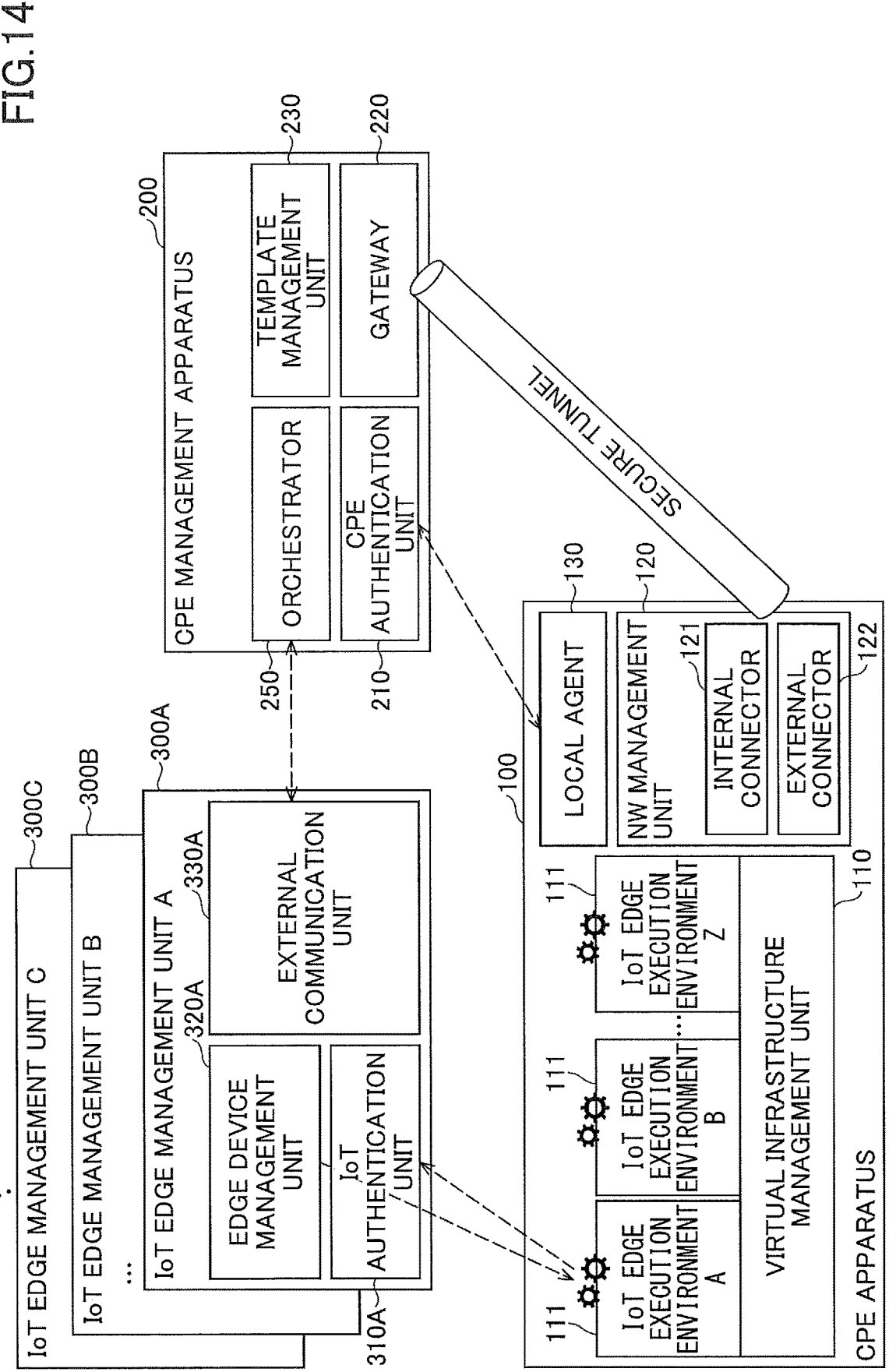
FIG. 14 is a schematic diagram of a configuration of a system according to a fourth embodiment.

FIG. 14 illustrates a system configuration according to the fourth embodiment. As illustrated in FIG. 14, in the system according to the fourth embodiment, the IoT edge management unit 300 is provided, and the CPE management apparatus 200 includes an orchestrator 250. The system configuration other than these points is the same as the system configuration according to the first embodiment (e.g., FIG. 1). When the second embodiment is used in the initial setting, the initial setting management unit 115 is provided, and when the third embodiment is used, the remote setting unit 240 is provided.

FIG. 14 illustrates IoT edge management units 300A, 300B, and 300C. When A to C of the IoT edge management units 300A, 300B, and 300C are not distinguished, it is described as the IoT edge management unit 300. The same applies to the internal configuration of the IoT edge management unit 300. The IoT edge management unit 300 may be referred to as the IoT edge management unit 300. Further, the IoT edge management unit 300 may be referred to as the management unit.

For example, the IoT edge management unit 300 is assumed to be a function for accessing the cloud (a function such as creating a group, creating authentication information, implementing authentication) in a cloud service provided by a cloud service provider (for example, AWS (registered trademark)). For example, the IoT edge management units 300A, 300B, and 300C correspond to a function provided by a cloud provider A, a function provided by a cloud provider B, and a function provided by a cloud provider C, respectively. Basically, the IoT edge execution environment 111 and the IoT edge management unit 300 have a one-to-one relationship. FIG. 14 illustrates an example in which an IoT edge execution environment 111A uses an IoT edge management unit 300A. Note that a single CPE apparatus 100 may use clouds of multiple cloud providers.

However, the above assumptions are merely an example. The IoT edge management unit 300 may be a device provided as a device that executes the function regardless of the service of the cloud provider.

As illustrated in FIG. 14, the IoT edge management unit 300 includes an IoT authentication unit 310, an edge device management unit 320, and an external communication unit 330. The IoT edge management unit 300A includes an IoT authentication unit 310A, an edge device management unit 320A, and an external communication unit 330A.

The IoT authentication unit 310 determines whether the IoT edge execution environment 111 can access the IoT edge management unit 300. The edge device management unit 320 manages the individual IoT edge execution environment 111. The external communication unit 330 communicates with an external system such as the CPE management apparatus 200.

The orchestrator 250 in the CPE management apparatus 200 controls the entire system including working together with the IoT edge management unit 300. The orchestrator 250 may be referred to as an acquiring unit.

FIG. 15 illustrates an example of configuration information for IoT edge environment management. The configuration information is managed (created, stored, changed, deleted, or the like) by the edge device management unit 320 of the IoT edge management unit 300. In the example illustrated in FIG. 15, the configuration information includes a group name and authentication information related to the target IoT edge execution environment 111. However, the group name and the authentication information are merely examples, and the configuration information may include access information and identification information. The configuration information may also include any one or more of the group name, the authentication information, the access information, and the identification information. The configuration information may also include information other than the group name, the authentication information, the access information, and the identification information.

In the fourth embodiment, when the edge device management unit 320 creates the configuration information for the IoT edge environment management, the group name is input from the CPE management apparatus 200 with respect to the edge device management unit 320. The edge device management unit 320 automatically generates the authentication information such as key information and a certificate.

A group identified by the group name is used, for example, to define a range of operations. Although the fourth and fifth embodiments illustrate an example in which a single location (i.e., a single CPE apparatus 100) is a single group, a single location (i.e., a single CPE apparatus 100) may use multiple groups.

FIG. 16 illustrates a VNF descriptor in a fourth embodiment. As illustrated in FIG. 16, user data and linkage information for the IoT edge management unit are added to the VNF descriptor according to the first embodiment (i.e., FIG. 5).

The key information (key) and the certificate (Cert) in the user data are in the form of variables because they are not determined when the service template is created by the template management unit (230).

An example of a script in the user data is a script that enables the IoT edge execution environment 111 to automatically insert (to write into a file) the key information and the certificate after startup.

When the edge device management unit 320 creates the configuration information for the IoT edge environment management, the authentication information such as the key information and the certificate is automatically generated. Therefore, the automatically generated key information and certificate are notified to the CPE management apparatus 200. The template management unit 230 of the CPE management apparatus 200 writes the key information and the certificate as the values of the variables "key" and "Cert" into the VNF descriptor to complement the VNF descriptor.

Further, the group name is designated as the linkage information for the IoT edge management unit in order to associate the corresponding IoT edge execution environment 111 with the corresponding configuration information for the IoT edge execution environment management.

<Setting Procedure>

A procedure of setting (provisioning) according to the fourth embodiment will be described with reference to the sequence diagram of FIG. 17 and FIG. 18.

Figure 17:
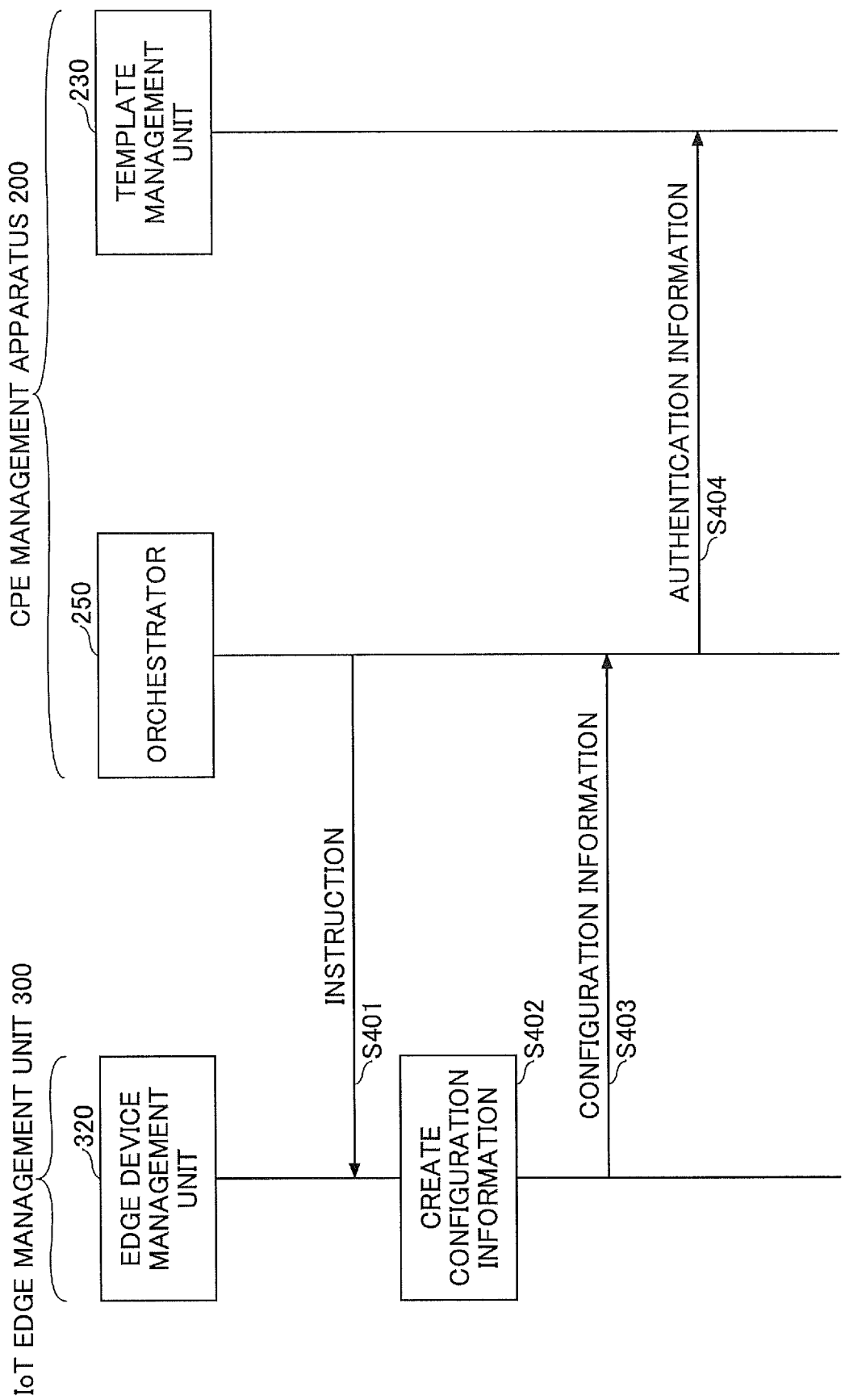
FIG. 17 is a sequence diagram for explaining a provisioning method of an IoT edge.

FIG. 17 illustrates a procedure until the authentication information is reflected in the service template (specifically, the VNF descriptor). Note that reflecting the authentication information is merely an example. The information acquired by the CPE management apparatus 200 from the IoT edge management unit 300 and transmitted to the CPE apparatus 100 is used in the CPE apparatus 100 as information to assist environment establishment/setting, an access to a cloud, authentication, and the like. Therefore, this information may be collectively referred to as "auxiliary information." The authentication information is an example of the "auxiliary information".

In S401 of FIG. 17, the orchestrator 250 of the CPE management apparatus 200 transmits an instruction that instructs the edge device management unit 320 to create the configuration information for the IoT edge execution environment management via the external communication unit 330 of the IoT edge management unit 300. This instruction includes the group name of the IoT edge execution environment 111 to be set.

The edge device management unit 320 creates the configuration information (for example, FIG. 15) in S402. The edge device management unit 320 generates the authentication information (the key information and the certificate) of the IoT edge execution environment 111 to include in the configuration information. In S403, the edge device management unit 320 transmits the generated configuration information to the orchestrator 250 via the external communication unit 330.

The orchestrator 250 that has received the configuration information acquires the authentication information to be used by the IoT edge execution environment 111 to access the corresponding edge device management unit 320 from the received configuration information. Then the acquired authentication information is reflected to the corresponding portion (the variable portion of the SSH script or user data) of the service template in the template management unit 230 (S404). The service template is transmitted to the CPE apparatus 100 according to the procedure described in the first embodiment.

Figure 18:
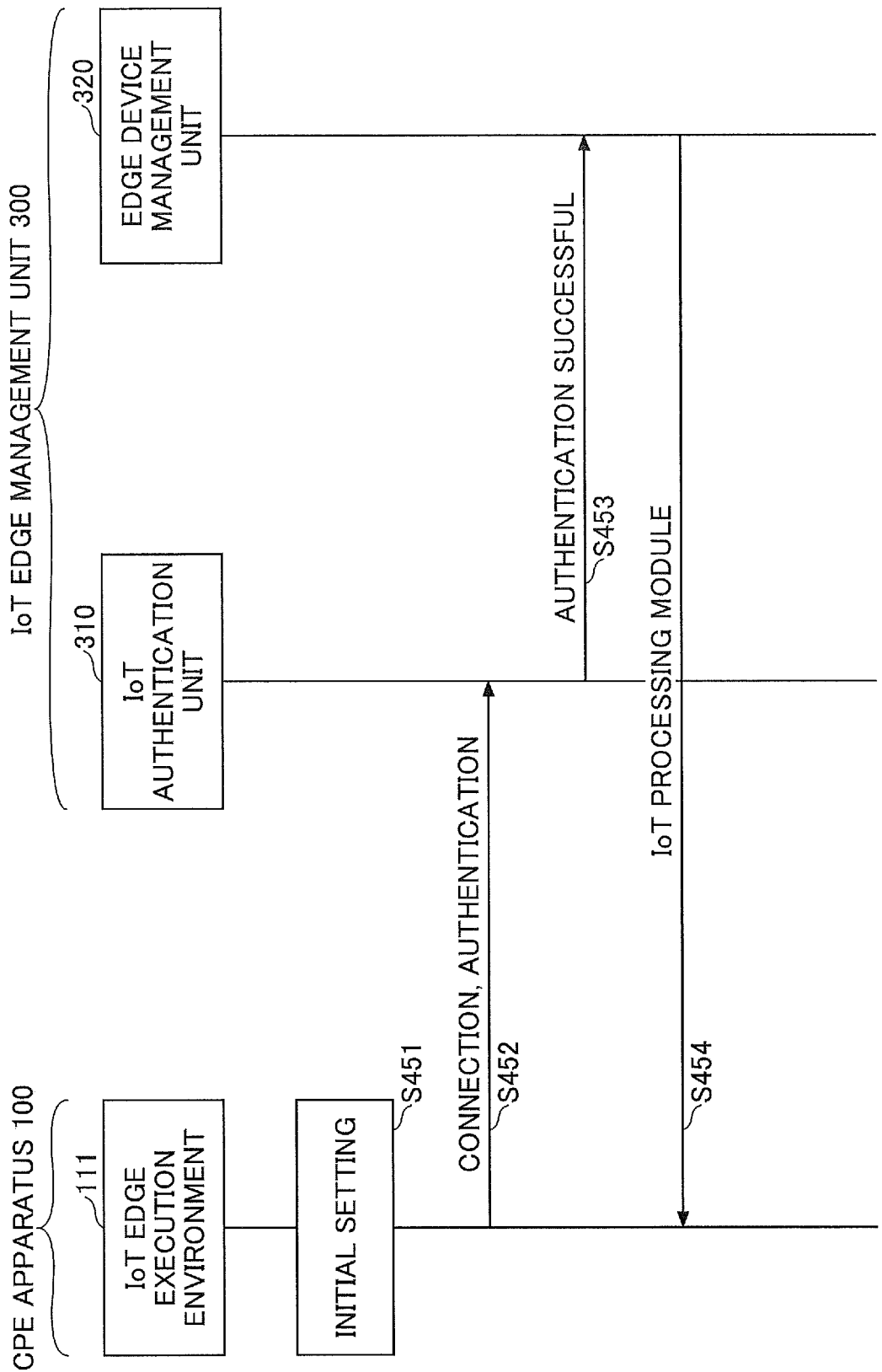
FIG. 18 is a sequence diagram for explaining a provisioning method of the IoT edge.

FIG. 18 illustrates a procedure from the initial setting to the module distribution. After the IoT edge execution environment 111 is established and started according to the procedure described in the first embodiment, the initial setting is performed in S451. In the initial setting, the authentication information (the key information and the certificate) described above is set to the IoT edge execution environment 111.

When the initial setting is performed by the initial setting management unit 115, as described in the second embodiment, the IoT edge execution environment 111 performs the initial setting by acquiring the user data (including the authentication information) from the initial setting management unit 115. In the case of performing the initial setting using the remote setting unit 240, as described in the third embodiment, the remote setting unit 240 remotely inputs the initial setting information (including the authentication information) with respect to the IoT edge execution environment 111.

In S452, the IoT edge execution environment 111 connects to the IoT authentication unit 310, transmits the authentication information to the IoT authentication unit 310, and the IoT authentication unit 310 performs the authentication of the IoT edge execution environment 111 using the authentication information. Herein, the authentication is assumed to be successful (S453). Note that authentication using the authentication information as described above is an example of processing for accessing the cloud using the auxiliary information.

After the successful authentication, in S454, the edge device management unit 320 accesses the corresponding IoT edge execution environment 111 and distributes a module for IoT processing.

The module for IoT processing (which may be referred to as software or a program) is executed on the IoT edge execution environment 111 to perform the IoT processing. As the IoT processing, the IoT edge execution environment 111 executes, for example, a process of performing image recognition from photo data received from an IoT device and transmitting the recognition result to the cloud.

Fifth Embodiment

Next, a fifth embodiment will be described. In the fifth embodiment, a related data management unit 260 is added to perform batch provisioning at multiple locations using both the template management unit 230 and the related data management unit 260. The configuration and the procedure other than the configuration and the procedure involved in the batch provisioning are the same as that in the fourth embodiment. Hereinafter, differences from the fourth embodiment will be mainly described. The techniques described in the fifth embodiment can be applied to any of the first to fourth embodiments.

<System Configuration>

Figure 19:
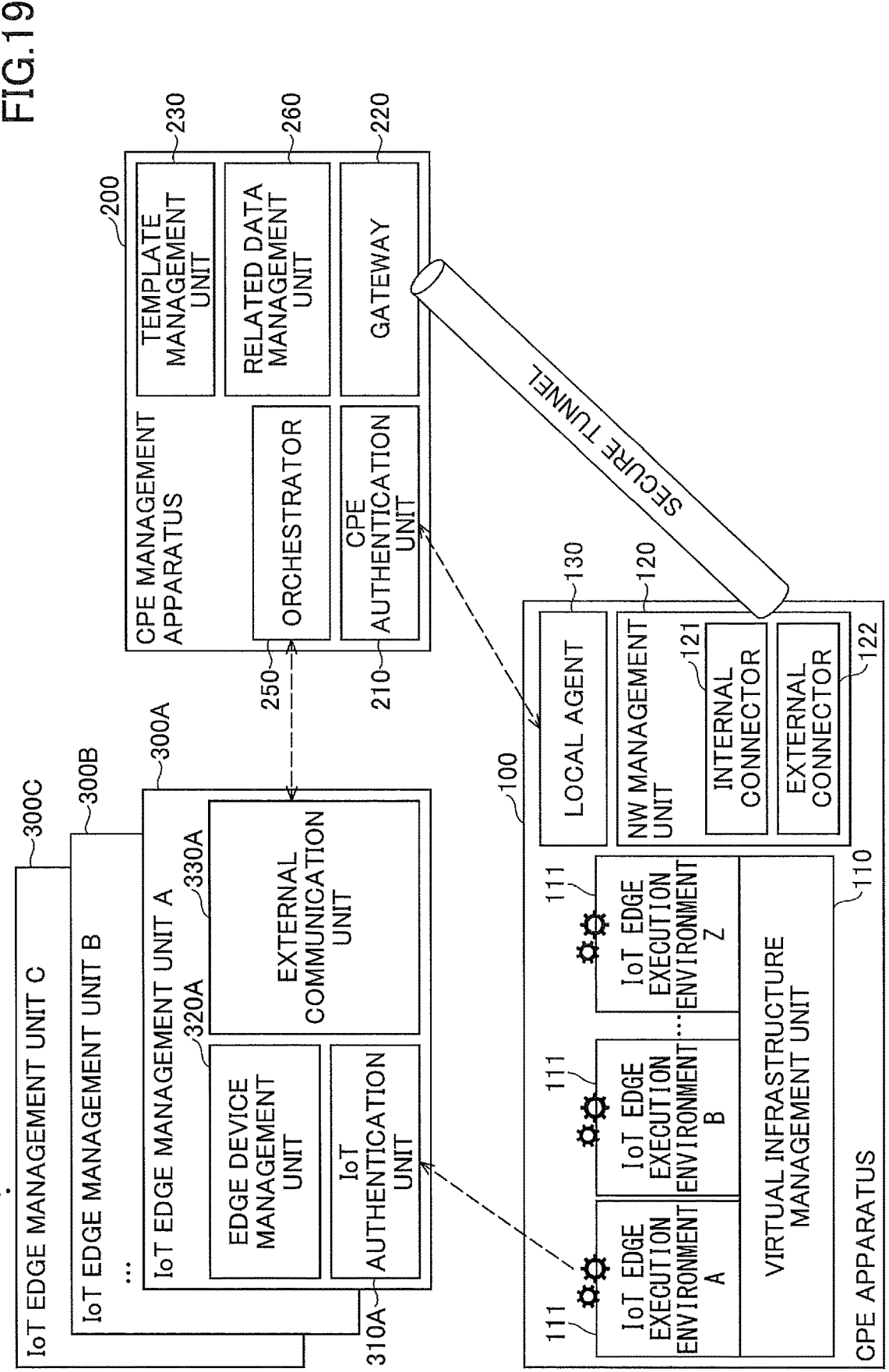
FIG. 19 is a schematic diagram of a configuration of a system according to a fifth embodiment.

FIG. 19 illustrates a system configuration according to the fifth embodiment. As illustrated in FIG. 19, in the system according to the fifth embodiment, a CPE management apparatus 200 includes a related data management unit 260. The system configuration other than the related data management unit 260 is the same as the system configuration according to the fourth embodiment (i.e., FIG. 14).

FIG. 20 illustrates an example of a CPE apparatus template managed by the template management unit 230 in the fifth embodiment. As illustrated in FIG. 20, some IoT edge-dependent parameter values (in the example of FIG. 20, a serial number, $serial) in the CPE apparatus template are not fixed values but variables. Except for this point, the CPE apparatus template in the fifth embodiment is the same as the CPE apparatus template described in the first embodiment.

An example of a service template in the fifth embodiment is illustrated in FIG. 21 (VNF descriptor) and FIG. 22 (service descriptor). Similar to the CPE apparatus template, some IoT edge-dependent parameter values are not fixed values but variables with respect to the service template.

In the fifth embodiment, for example, a group name in the VNF descriptor illustrated in FIG. 21 is denoted by $group, and a CIDR and a GW in the service descriptor illustrated in FIG. 22 are denoted by a $cidr and $gw, respectively.

Further, in the fifth embodiment, the related data management unit 260 manages CPE apparatus-related data (such as generating, storing, changing, and deleting) as illustrated in FIG. 23. The CPE apparatus-related data manages the values of the parameters depending on the individual CPE apparatus 100 and the IoT edge execution environment 111 included in the CPE apparatus 100. As illustrated in FIG. 23, the CPE apparatus-related data includes the values of variable parameters ($serial, $group, $cidr, $gw) for each CPE apparatus 100 (CPE1, CPE2, CPE3).

<Setting Procedure>

Figure 24:
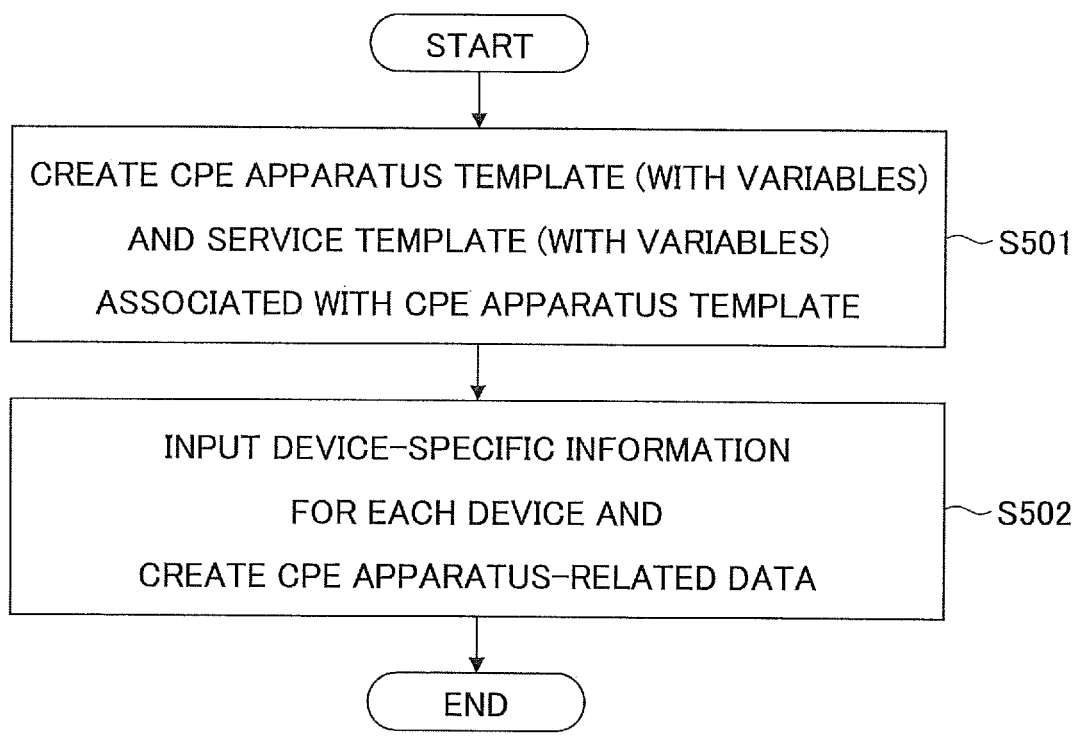
FIG. 24 is a flowchart for explaining a provisioning method of an IoT edge.

A method of provisioning a large number of IOT edge locations at once will be described. FIG. 24 illustrates a flowchart of processing performed by the template management unit 230.

In S501, the template management unit 230 creates the CPE apparatus template (with variables) (for example, FIG. 20) and the service template (with variables) (for example, FIG. 21 and FIG. 22).

With regard to the CPE apparatus template (with variables) and service template (with variables), for example, if the service configuration is the same (specific values are different) in Location 1 and Location 2, the CPE apparatus template (with variables) and service template (with variables) common to Location 1 and Location 2 can be used. A common template may be referred to as common setting information.

In S502, the related data management unit 260 creates the CPE apparatus-related data (for example, FIG. 23) using information specific to an individual CPE apparatus (IoT edge).

Subsequently, provisioning to the multiple CPE apparatus 100 can be performed automatically for each location according to the method described above.

For example, when provisioning for Location 1 (CPE1 in FIG. 23), the template management unit 230 reads out the value of CPE1 from the CPE apparatus-related data (for example, FIG. 23) in the related data management unit 260 and completes the CPE apparatus template and the service template by inputting values in the corresponding variables in the CPE apparatus template (with variables) and the service template (with variables).

Subsequently, by using any of the methods described in the first to fourth embodiments, the IoT edge execution environment 111 in the CPE apparatus 100 can be established and started, and the setting to the IoT edge execution environment 111 can be performed.

(Example of Hardware Configuration) The CPE apparatus 100 described in the first to fifth embodiments may be implemented, for example, by causing a computer (for example, a server, a white switch, or the like) to execute a program.

The CPE management apparatus 200 described in the first to fifth embodiments may be implemented, for example, by causing a computer (for example, a server) to execute a program. The CPE management apparatus 200 may be implemented on a physical machine or may be implemented on a virtual machine. The CPE management apparatus 200 is not required to be a single device, but may be a device having a configuration in which multiple devices are connected to a network.

The IoT edge management unit 300 (the IoT edge management apparatus) described in the first to fifth embodiments may be implemented, for example, by causing a computer (for example, a server) to execute a program. The IoT edge management unit 300 may be implemented on a physical machine or may be implemented on a virtual machine.

The functions of each of the above-described devices may be implemented by executing a program corresponding to the processing performed by the devices using hardware resources such as CPU and memory embedded in the computer. The program may be recorded on a computer-readable storage medium (a portable memory, or the like), and then distributed and/or saved. Further, the program may be provided via a network, such as the Internet or e-mail.

Figure 25:
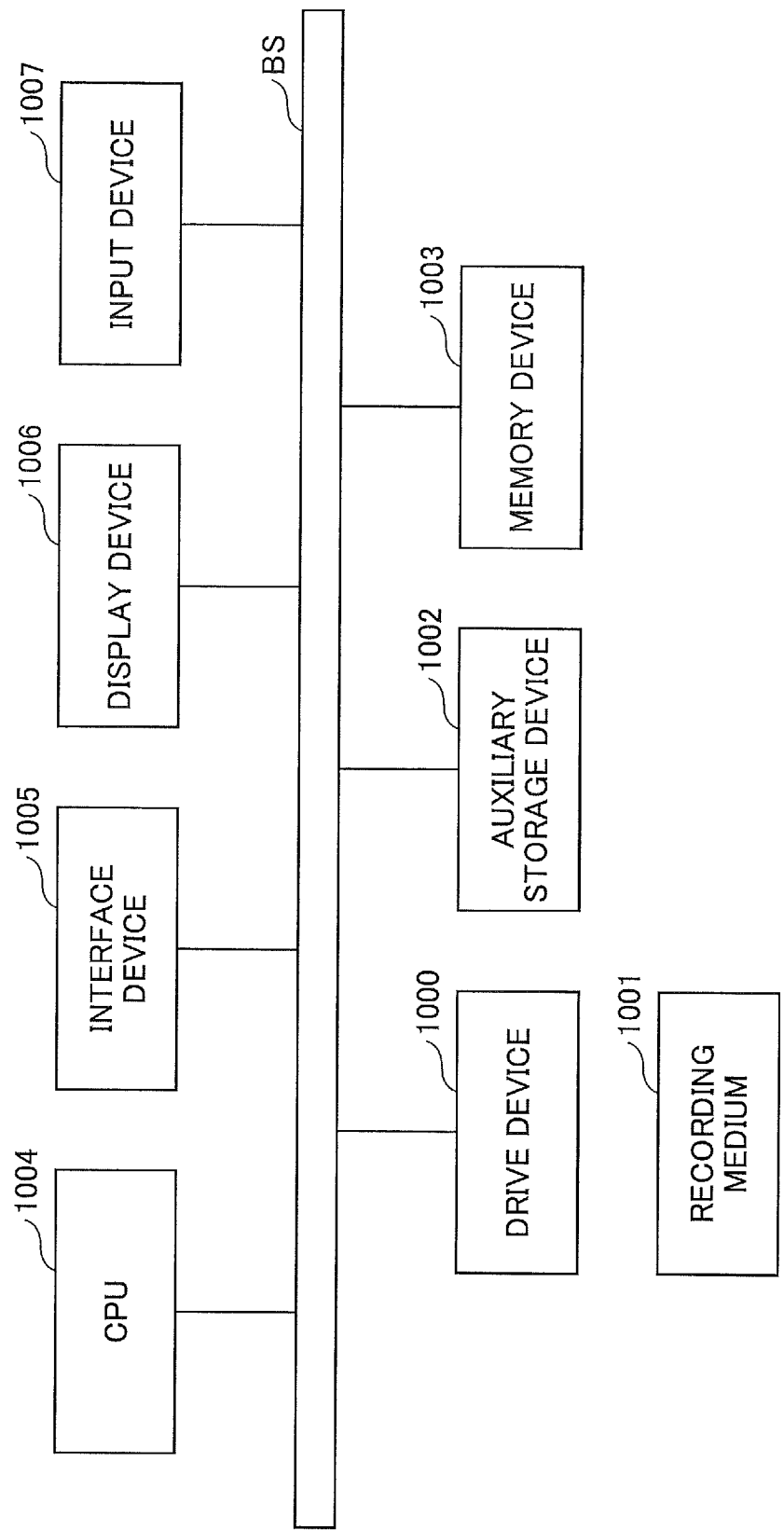
FIG. 25 is a diagram illustrating an example of a hardware configuration.

FIG. 25 is a diagram illustrating an example of a hardware configuration of the above-described devices. The device of FIG. 25 includes a drive device 1000, an auxiliary storage device 1002, a memory device 1003, a CPU 1004, an interface device 1005, a display device 1006, an input device 1007, and the like, which are connected to each other by a bus B. Each of the above-described devices (such as the CPE apparatus 100, the CPE management apparatus 200, and the IoT edge management unit 300) may or may not be provided with the display device 1006 and the input device 1007.

A program for implementing processing with each of the devices is provided by a recording medium 1001, such as a CD-ROM or a memory card. When the recording medium 1001 on which the program is stored is set in the drive device 1000, the program is installed in the auxiliary storage device 1002 from the recording medium 1001 via the drive device 1000. However, the installation of the program is not necessarily be performed by the recording medium 1001, and the program may be downloaded from another computer via the network. The auxiliary storage device 1002 stores the installed program and stores necessary files, data, and the like.

The memory device 1003 reads out and stores the program from the auxiliary storage device 1002 upon an instruction to start the program. The CPU 1004 implements the function of the appropriate device according to the program stored in the memory device 1003. An interface device 1005 is used as an interface for connecting to a network. The display device 1006 displays a Graphical User Interface (GUI) and the like according to the program. The input device 1007 includes a keyboard, a mouse, buttons, a touch panel, and the like. The input device 1007 is used to input various operating instructions.

Effect of Embodiment

According to the technique described above, automatic authentication of the CPE apparatus 100 including the IoT edge execution environment, the tunnel, automatic connection with the centralized CPE management apparatus 200, and automatic provisioning, remote management and control of CPE apparatus 100 using the orchestration mechanism based on the templet are implemented.

Further, by working together with the IoT edge management unit 300 on the cloud, not only the CPE apparatus 100 but also the automatic provisioning of the authentication information of the IoT edge execution environment 111 can be implemented. Further, by allowing variables in the template and managing multiple CPE apparatus 100 with a single template, automatic batch provisioning can be implemented for introduction to a large number of locations.

Summary of Embodiments

The present disclosure discloses at least the techniques of each of the following Appendix 1 and Appendix 2.

<Appendix 1>

(Clause 1) A setting apparatus for setting a communication apparatus, the setting apparatus comprising:
 a tunnel creation unit configured to create a tunnel between the communication apparatus and the setting apparatus; and
 a setting information management unit configured to transmit setting information to the communication apparatus via the tunnel, and
 wherein an IoT edge execution environment is established based on the setting information in the communication apparatus.

(Clause 2) The setting apparatus according to clause 1, wherein an internal connection of the communication apparatus is established based on the setting information in the communication apparatus.

(Clause 3) The setting apparatus according to clause 1 or 2, wherein the setting information management unit identifies the communication apparatus based on an identifier received from the communication apparatus and transmits the setting information to the communication apparatus.

(Clause 4) The setting apparatus according to any one of clauses 1 to 3, further comprising a remote setting unit configured to monitor a startup state of the IoT edge execution environment and transmit, upon determining that the IoT edge execution environment has completely started, initial setting information to the IoT edge execution environment.

(Clause 5) The setting apparatus according to any one of clauses 1 to 4, wherein initial setting is performed upon the IoT edge execution environment acquiring initial setting information in the communication apparatus.

(Clause 6) The setting apparatus according to any one of clauses 1 to 5, further comprising a related data management unit configured to store communication apparatus-related data including a variable and a value with respect to the communication apparatus corresponding to the variable, and
wherein the setting information management unit inputs a value of the variable into common setting information including the variable by referring to the communication apparatus-related data, generates the setting information, and transmits the setting information to the communication apparatus.
(Clause 7) A communication system including the setting apparatus and the communication apparatus according to any one of clauses 1 to 6.
(Clause 8) A setting method executed by a setting apparatus for setting a communication apparatus, the method comprising:
creating a tunnel between the communication apparatus and the setting apparatus; and
transmitting setting information to the communication apparatus via the tunnel, and
wherein an IoT edge execution environment is established based on the setting information in the communication apparatus.
(Clause 9) A program for causing a computer to function as each unit in the setting apparatus according to any one of clauses 1 to 6.
<Appendix 2>
(Clause 1) A setting apparatus for setting a communication apparatus, the setting apparatus comprising:
an acquiring unit configured to acquire auxiliary information from a management unit configured to execute processing for accessing a cloud; and
a setting information management unit configured to transmit setting information including the auxiliary information to the communication apparatus, and
wherein the auxiliary information is set to an IoT edge execution environment established in the communication apparatus.
(Clause 2) A setting apparatus for setting a communication apparatus, the setting apparatus comprising:
an acquiring unit configured to acquire auxiliary information from a management unit configured to execute processing for accessing a cloud;
a setting information management unit configured to transmit setting information to the communication apparatus; and
a remote setting unit configured to transmit the auxiliary information to an IoT edge execution environment established based on the setting information in the communication apparatus.
(Clause 3) The setting apparatus according to clause 1 or 2, wherein the acquiring unit transmits an instruction including a group name to the management unit and acquires the auxiliary information generated by the management unit, based on the instruction.
(Clause 4) The setting apparatus according to any one of clauses 1 or 3, further comprising a related data management unit configured to store communication apparatus-related data including a variable and a value with respect to the communication apparatus corresponding to the variable, and
wherein the setting information management unit inputs a value of the variable into common setting information including the variable by referring to the communication apparatus-related data, generates the setting information, and transmits the setting information to the communication apparatus.
(Clause 5) A communication system including the setting apparatus and the communication apparatus according to any one of clauses 1 to 4.
(Clause 6) The communication system according to clause 5, wherein the IoT edge execution environment transmits the auxiliary information to the management unit, and, when authentication based on the auxiliary information is successful in the management unit, receives a module for IoT processing from the management unit.
(Clause 7) A setting method executed by a setting apparatus for setting a communication apparatus, the method comprising:
acquiring auxiliary information from a management unit configured to execute processing for accessing a cloud; and
transmitting setting information including the auxiliary information to the communication apparatus, and
wherein the auxiliary information is set to an IoT edge execution environment established in the communication apparatus.
(Clause 8) A setting method executed by a setting apparatus for setting a communication apparatus, the method comprising:
acquiring auxiliary information from a management unit configured to execute processing for accessing a cloud;
transmitting setting information to the communication apparatus; and
transmitting the auxiliary information to an IoT edge execution environment established based on the setting information in the communication apparatus.
(Clause 9) A program for causing a computer to function as each unit in the setting apparatus according to any one of clauses 1 to 4.
Although the present embodiment has been described above, the present invention is not limited to such a specific embodiment, and although the present embodiment has been described above, the present invention is not limited to such a specific embodiment.

What is claimed is:

1. A setting apparatus for setting a communication apparatus, the setting apparatus comprising:
a memory; and
a processor configured to:
acquire auxiliary information from a management apparatus configured to execute processing for accessing a cloud; and
transmit setting information including the auxiliary information to the communication apparatus, and
wherein the auxiliary information is set to an IoT edge execution environment established in the communication apparatus,
wherein after the IoT edge execution environment is established, the processor monitors a startup state of the IoT edge execution environment,
wherein upon determining that the IoT edge execution environment has been started, the processor inputs initial setting information that is described by a virtual network function (VNF) descriptor into the IoT edge execution environment, and
wherein the VNF descriptor describes parameters indicating a CPU, a memory, and one or more ports of the IoT edge execution environment.

2. The setting apparatus according to claim 1, wherein the processor is further configured to transmit an instruction including a group name to the management apparatus and acquire the auxiliary information generated by the management apparatus, based on the instruction.

3. The setting apparatus according to claim 1, wherein the processor is further configured to store communication apparatus-related data including a variable and a value with respect to the communication apparatus corresponding to the variable,
    input a value of the variable into common setting information including the variable by referring to the communication apparatus-related data, generate the setting information, and transmit the setting information to the communication apparatus.

4. A communication system including the setting apparatus and the communication apparatus according to claim 1.

5. The communication system according to claim 2, wherein the IoT edge execution environment transmits the auxiliary information to the management apparatus, and, when authentication based on the auxiliary information is successful in the management apparatus, receives a module for IoT processing from the management apparatus.

6. A non-transitory computer-readable recording medium having stored thereon a program for causing a computer to function as the setting apparatus according to claim 1.

7. A setting apparatus for setting a communication apparatus, the setting apparatus comprising:
    a memory; and
    a processor configured to:
        acquire auxiliary information from a management apparatus configured to execute processing for accessing a cloud;
        transmit setting information to the communication apparatus; and
        transmit the auxiliary information to an IoT edge execution environment established based on the setting information in the communication apparatus,
    wherein after the IoT edge execution environment is established, the processor monitors a startup state of the IoT edge execution environment,
    wherein upon determining that the IoT edge execution environment has been started, the processor inputs initial setting information that is described by a virtual network function (VNF) descriptor into the IoT edge execution environment, and
    wherein the VNF descriptor describes parameters indicating a CPU, a memory, and one or lore ports of the IoT edge execution environment.

8. A setting method executed by a setting apparatus including a memory and a processor, for setting a communication apparatus, the method comprising:
    acquiring auxiliary information from a management apparatus configured to execute processing for accessing a cloud; and
    transmitting setting information including the auxiliary information to the communication apparatus, and
    wherein the auxiliary information is set to an IoT edge execution environment established in the communication apparatus
    wherein the method further comprises:
        monitoring, after the IoT edge execution environment is established, a startup state of the IoT edge execution environment; and
        inputting, upon determining that the IoT edge execution environment has been started, initial setting information that is described by a virtual network function (VNF) descriptor into the IoT edge execution environment, and
    wherein the VNF descriptor describes parameters indicating a CPU, a memory, and one or more ports of the IoT edge execution environment.

\* \* \* \* \*